(12) United States Patent
Mukai et al.

(10) Patent No.: US 10,933,865 B2
(45) Date of Patent: Mar. 2, 2021

(54) DRIVING ASSISTANCE DEVICE

(71) Applicant: DENSO CORPORATION, Kariya (JP)

(72) Inventors: Yasuhiko Mukai, Kariya (JP); Noriyasu Noto, Kariya (JP); Tetsuya Tokuda, Kariya (JP); Masanobu Yamaguchi, Kariya (JP); Yasunobu Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 243 days.

(21) Appl. No.: 16/076,460

(22) PCT Filed: Feb. 10, 2017

(86) PCT No.: PCT/JP2017/005009
§ 371 (c)(1),
(2) Date: Aug. 8, 2018

(87) PCT Pub. No.: WO2017/138659
PCT Pub. Date: Aug. 17, 2017

(65) Prior Publication Data
US 2019/0039610 A1 Feb. 7, 2019

(30) Foreign Application Priority Data

Feb. 10, 2016 (JP) .............................. JP2016-023907
Jan. 24, 2017 (JP) .............................. JP2017-010550

(51) Int. Cl.
*B60W 30/09* (2012.01)
*B60W 30/095* (2012.01)
(Continued)

(52) U.S. Cl.
CPC .......... *B60W 30/09* (2013.01); *B60W 30/095* (2013.01); *B60W 30/0956* (2013.01);
(Continued)

(58) Field of Classification Search
CPC . B60W 30/09; B60W 30/095; B60W 30/0956
See application file for complete search history.

(56) References Cited

U.S. PATENT DOCUMENTS

| 8,229,663 | B2 * | 7/2012 | Zeng ...................... G08G 1/163 |
| | | | 701/301 |
| 8,466,807 | B2 * | 6/2013 | Mudalige ............... G08G 1/163 |
| | | | 340/903 |

(Continued)

FOREIGN PATENT DOCUMENTS

| CN | 104943689 A | 9/2015 |
| JP | 2008-181200 A | 8/2008 |

OTHER PUBLICATIONS

Laneurit et al., "Multisensorial Data Fusion for Global Vehicle and Obstacles Absolute Positioning", IEEE Intelligent Vehicles Symposium, Jun. 2003, pp. 138-143. (Year: 2003).*

(Continued)

*Primary Examiner* — Todd Melton
(74) *Attorney, Agent, or Firm* — Maschoff Brennan

(57) ABSTRACT

A driving assistance device includes a travel information acquisition unit, a first information acquisition unit, a second information acquisition unit, a first determination unit, a second determination unit, a first avoidance-amount setting unit, a second avoidance-amount setting unit, and a driving control unit. The second avoidance-amount setting unit sets, when the second avoidance-amount setting unit sets a control amount of a driving control as a second avoidance amount for performing a second avoidance driving action, the control amount smaller than a control amount that is set as a first avoidance amount by the first avoidance-amount setting unit, and sets, when the second avoidance-amount setting unit sets a start timing of the driving control as the second avoidance amount for performing the second avoid- (Continued)

ance driving action, the start timing later than a start timing that is set as the first avoidance amount by the first avoidance-amount setting unit.

12 Claims, 7 Drawing Sheets

(51) Int. Cl.
*G06K 9/00* (2006.01)
*G08G 1/16* (2006.01)
(52) U.S. Cl.
CPC ......... *G06K 9/00805* (2013.01); *G08G 1/163* (2013.01); *G08G 1/166* (2013.01); *B60W 2554/00* (2020.02); *B60W 2556/45* (2020.02)

(56) References Cited

U.S. PATENT DOCUMENTS

| | | | |
|---|---|---|---|
| 9,446,729 B2* | 9/2016 | Goerick | B60W 30/095 |
| 2016/0167579 A1* | 6/2016 | Hwang | G08G 1/163 |
| | | | 340/435 |
| 2017/0116860 A1 | 4/2017 | Tan et al. | |

OTHER PUBLICATIONS

Hafner et al., "Cooperative Collision Avoidance at Intersections: Algorithms and Experiments", IEEE Transactions on Intelligent Transportation Systems, vol. 14 No. 3, Sep. 2013, pp. 1162-1175. (Year: 2013).*

* cited by examiner

DRIVING ASSISTANCE DEVICE

CROSS REFERENCE TO RELATED APPLICATIONS

The present international application claims the priority of Japanese Patent Application No. 2016-023907 filed in Japan Patent Office on Feb. 10, 2016, and the priority of Japanese Patent Application No. 2017-010550 filed in Japan Patent Office on Jan. 24, 2017, and the entire contents of these are incorporated herein by reference.

TECHNICAL FIELD

The present disclosure relates to a technology for avoiding a collision of an own vehicle with a moving object around the own vehicle.

BACKGROUND ART

As an example of the technology for avoiding the collision of an own vehicle with a moving object around the own vehicle, there has been known a technology including calculating a risk of collision of an own vehicle with a moving object based on a position and a vehicle speed contained in a travel information item of the own vehicle, and on a position and a speed contained in a movement-information item of the moving object, and actuating brakes if the risk of collision is high. The movement-information item of the moving object is detected by detection devices installed in the own vehicle, such as a camera and a millimeter-wave radar.

Patent Literature 1 (PTL 1) below discloses a technology including transmitting, via wireless communication, a warning information item from a first vehicle to a second vehicle located in a traveling direction of the first vehicle in case where a risk of collision of the first vehicle with the second vehicle is equal to or more than a threshold. The warning information item includes the risk of collision, a position information item of the first vehicle, and the traveling direction of the first vehicle.

When the second vehicle receives the warning information item from an external device, that is, from a communication device of the first vehicle, and at the same time, when the first vehicle that has transmitted the warning information item is located behind the second vehicle, the second vehicle starts, and disengages a stop-holding mode or accelerates so as to avoid the collision with the first vehicle or to reduce damage from the collision.

CITATION LIST

Patent Literature

[PTL 1] JP 2008-181200 A

SUMMARY OF THE INVENTION

As in the technology disclosed in Patent Literature 1, when the movement-information item of the moving object around the own vehicle is acquired indirectly via wireless communication or the like, communication radio waves are, for example, interrupted or affected by noise. Thus, a reliability of the movement-information item acquired indirectly via wireless communication or the like is lower than a reliability in a case where the movement-information item of the moving object is acquired directly from the in-vehicle detection devices such as the camera and the millimeter-wave radar.

Through intensive studies, the inventors have found a problem that, when the own vehicle avoids the collision with the moving object by braking or controlling steering based on the indirectly-acquired movement-information item of the moving object around the own vehicle, the own vehicle may perform an unnecessary avoidance driving action even when there is no risk of collision with the moving object. In addition, the inventors have found another problem that, since the avoidance driving action is not a normal driving action that passengers expect, the passengers feel anxiety when the own vehicle is caused to perform the avoidance driving action.

Meanwhile, even though the reliability of the indirectly-acquired movement-information item of the moving object is low, there is a risk (probability) of collision of the own vehicle with the moving object. Thus, in consideration of safety, it is desired to perform the avoidance driving action.

According to an aspect of the present disclosure, it is desired to provide a technology for appropriately controlling, based on a movement-information item of a moving object around an own vehicle, which is acquired from detection devices installed in the own vehicle, and on another movement-information item of the same, which is acquired from an external device, driving of the own vehicle for the purpose of avoiding a collision of the own vehicle with the moving object while alleviating anxiety of passengers.

According to the aspect of the present disclosure, there is provided a driving assistance device including a travel information acquisition unit, a first information acquisition unit, a second information acquisition unit, a first determination unit, a second determination unit, a first avoidance-amount setting unit, a second avoidance-amount setting unit, and a driving control unit.

The travel information acquisition unit acquires at least a position and a vehicle speed of an own vehicle as a travel information item of the own vehicle. The first information acquisition unit acquires, as a first information item of a moving object around the own vehicle, at least a position and a speed of the moving object from a detection device installed in the own vehicle. The second information acquisition unit acquires, as a second information item of the moving object, at least a position and a speed of the moving object from an external device that is external to the own vehicle.

The first determination unit determines, based on the travel information item that the travel information acquisition unit acquires and on the first movement-information item that the first information acquisition unit acquires, a first risk (first probability) of collision of the own vehicle with the moving object, and determines, based on the first risk, whether or not to perform a first avoidance driving action (first avoidance maneuver) for avoiding the collision of the own vehicle with the moving object.

The second determination unit determines, based on the travel information item that the travel information acquisition unit acquires and on the second movement-information item that the second information acquisition unit acquires, a second risk (second probability) of collision of the own vehicle with the moving object, and determines, based on the second risk, whether or not to perform a second avoidance driving action (second avoidance maneuver) for avoiding the collision of the own vehicle with the moving object.

The first avoidance-amount setting unit sets, when the first determination unit determines that the first avoidance driving action is being performed, a first avoidance amount for avoiding the collision of the own vehicle with the moving object based on the first risk that the first determination unit determines.

The second avoidance-amount setting unit sets, when the second determination unit determines that the second avoidance driving action is being performed, a second avoidance amount for avoiding the collision of the own vehicle with the moving object based on the second risk that the second determination unit determines, sets, when the second avoidance-amount setting unit sets a control amount of a control of driving of the own vehicle as the second avoidance amount, the control amount smaller than a control amount that is set as the first avoidance amount by the first avoidance-amount setting unit in a case where the first avoidance driving action is performed, and sets, when the second avoidance-amount setting unit sets a start timing of the control of driving of the own vehicle as the second avoidance amount, the start timing later than a start timing that is set as the first avoidance amount by the first avoidance-amount setting unit in the case where the first avoidance driving action is performed.

The driving control unit controls, based on the first avoidance amount that the first determination unit sets and on the second avoidance amount that the second avoidance-amount setting unit sets, a motion of the own vehicle such that the collision of the own vehicle with the moving object is avoided.

With this configuration, it is more likely that the collision of the own vehicle with the moving object can be avoided in the case where driving of the own vehicle is controlled based on the second avoidance amount such that the own vehicle is caused to perform the avoidance driving action than in a case where the own vehicle is not caused to perform the avoidance driving action at all. Further, even if the collision of the own vehicle with the moving object occurs, damage to the own vehicle and the moving object can be reduced. Thus, according to the aspect of the present disclosure, an appropriate control of driving of the own vehicle for the purpose of avoiding the collision of the own vehicle with the moving object can be performed.

In addition, when the control amount of the control of driving of the own vehicle is set as the second avoidance amount in the case where the second avoidance driving action is performed, the control amount is set smaller than the control amount that is set as the first avoidance amount in the case where the first avoidance driving action is performed. When the start timing of the control of driving of the own vehicle is set as the second avoidance amount, the start timing is set later than the start timing that is set as the first avoidance amount in the case where the first avoidance driving action is performed. With this, in a case where driving of the own vehicle is controlled based on the second avoidance amount such that the own vehicle is caused to perform the avoidance driving action, anxiety of passengers can be alleviated.

Note that, the parenthesized reference symbols described in the claims represent correspondences to the specific means described in the embodiments that are described below as an example, and do not limit the technical scope of the present disclosure.

DESCRIPTION OF EMBODIMENTS

Embodiments to which the present disclosure is applied will be described below on the basis of the drawings.

1. Configuration

Figure 1:
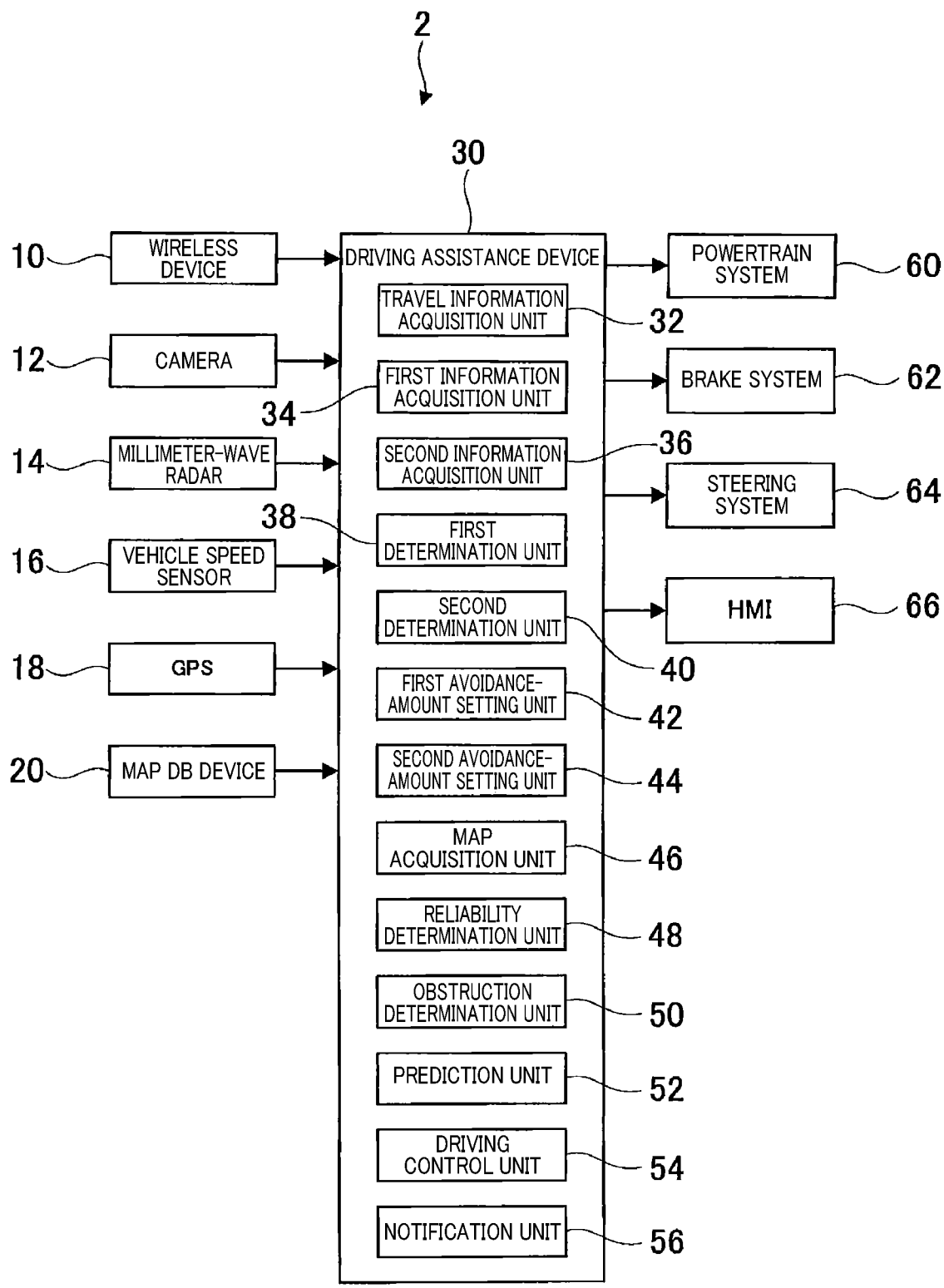
FIG. 1 is a block diagram showing a driving assistance system according to an embodiment of the present disclosure.

A driving assistance system 2 shown in FIG. 1 is installed in a vehicle, and includes a wireless device 10, cameras 12, millimeter-wave radars 14, a vehicle speed sensor 16, GPS 18, a map DB device 20, a driving assistance device 30, a powertrain system 60, a brake system 62, a steering system 64, and an HMI 66. The HMI is an abbreviation of Human Machine Interface. In the following, a vehicle in which the driving assistance system 2 is installed is referred to as an own vehicle.

The wireless device 10 performs wireless communication with an external device that is external to the own vehicle. The external device may be worn by a person, or installed in any of a bicycle, a vehicle including a drive source, roadside equipment, and a control center.

The cameras 12 perform forward imaging, side imaging, and rearward imaging from the own vehicle. Data items of the images captured by the cameras 12 are analyzed by an image analysis device (not shown). With this, moving objects that exist ahead of, sideways, and behind the own vehicle are detected.

The millimeter-wave radars 14 scan ranges at predetermined angles by outputting millimeter waves forward, sideways, and rearward from the own vehicle. The millimeter-wave radars 14 detect reflected waves of the radiated millimeter waves, calculates a distance to the object based on a period that the millimeter waves have taken to reciprocate between the millimeter-wave radars 14 and an object that have reflected the millimeter waves, and specifies, based on directions in which the millimeter-wave radars 14 have radiated the millimeter waves and in response to the detection of the reflected waves, an orientation in which the object exists.

Note that, instead of the radars such as the millimeter-wave radars 14, which radiate electromagnetic waves, LIDAR that radiates laser beams may also be used.

The vehicle speed sensor 16 detects a current vehicle speed of the own vehicle. The GPS 18 locates a position of the own vehicle by receiving a location signal from a GPS satellite.

A map data item stored in the map DB device 20 contains links and nodes that represent roads. The links connect the nodes that represent, for example, intersections, branch points, and junctions. The roads are rendered by connecting the links. Data items of, for example, identification numbers, link lengths, latitudes and longitudes as coordinates of an origin point and a destination point, road types representing, for example, expressways or national routes, and the number of lanes are registered with the links.

Further, sizes of structures such as buildings located along the links that represent roads, and sizes of structures around the nodes that represent, for example, intersections, branch points, and junctions are registered with the map data item.

In the driving assistance device 30, a microcomputer including a CPU and semiconductor memories such as RAM, ROM, and a flash memory is installed. Note that, the microcomputer installed in the driving assistance device 30 may include a single microcomputer, or may include a plurality of microcomputers.

In order to exert functions of the driving assistance device 30, the CPU executes programs stored in non-transitory computer-readable storage medium such as the ROM and the flash memory. When those programs are executed, methods corresponding to the programs are carried out.

As components having the functions to be exerted by the execution of the programs by the CPU, the driving assistance device 30 includes a travel information acquisition unit 32, a first information acquisition unit 34, a second information acquisition unit 36, a first determination unit 38, a second determination unit 40, a first avoidance-amount setting unit 42, a second avoidance-amount setting unit 44, a map acquisition unit 46, a reliability determination unit 48, an obstruction determination unit 50, a prediction unit 52, a driving control unit 54, and a notification unit 56.

A method of activating these units of the driving assistance device 30 is not limited to software, and some or all of these units may be activated with use of hardware constituted by a combination of logic circuits and analog circuits.

In accordance with drive output set by the driving assistance device 30, the powertrain system 60 controls an opening degree of a throttle device and a fuel injection rate in a case where an internal combustion engine is installed as the drive source, or the powertrain system 60 controls electric power supply to a motor in a case where the motor is installed as the drive source.

In accordance with a braking force set by the driving assistance device 30, the brake system 62 controls actuators provided in hydraulic circuits of hydraulic brakes. In the case where the motor is installed as the drive source to the own vehicle, the brake system 62 may generate a regenerative braking force by controlling the electric power supply to the motor in accordance with the braking force set by the driving assistance device 30.

The steering system 64 drives a steering wheel in accordance with torque set by the driving assistance device 30 so as to control a traveling direction of the own vehicle.

2. Procedure (1) Summary of Procedure

Figure 2:
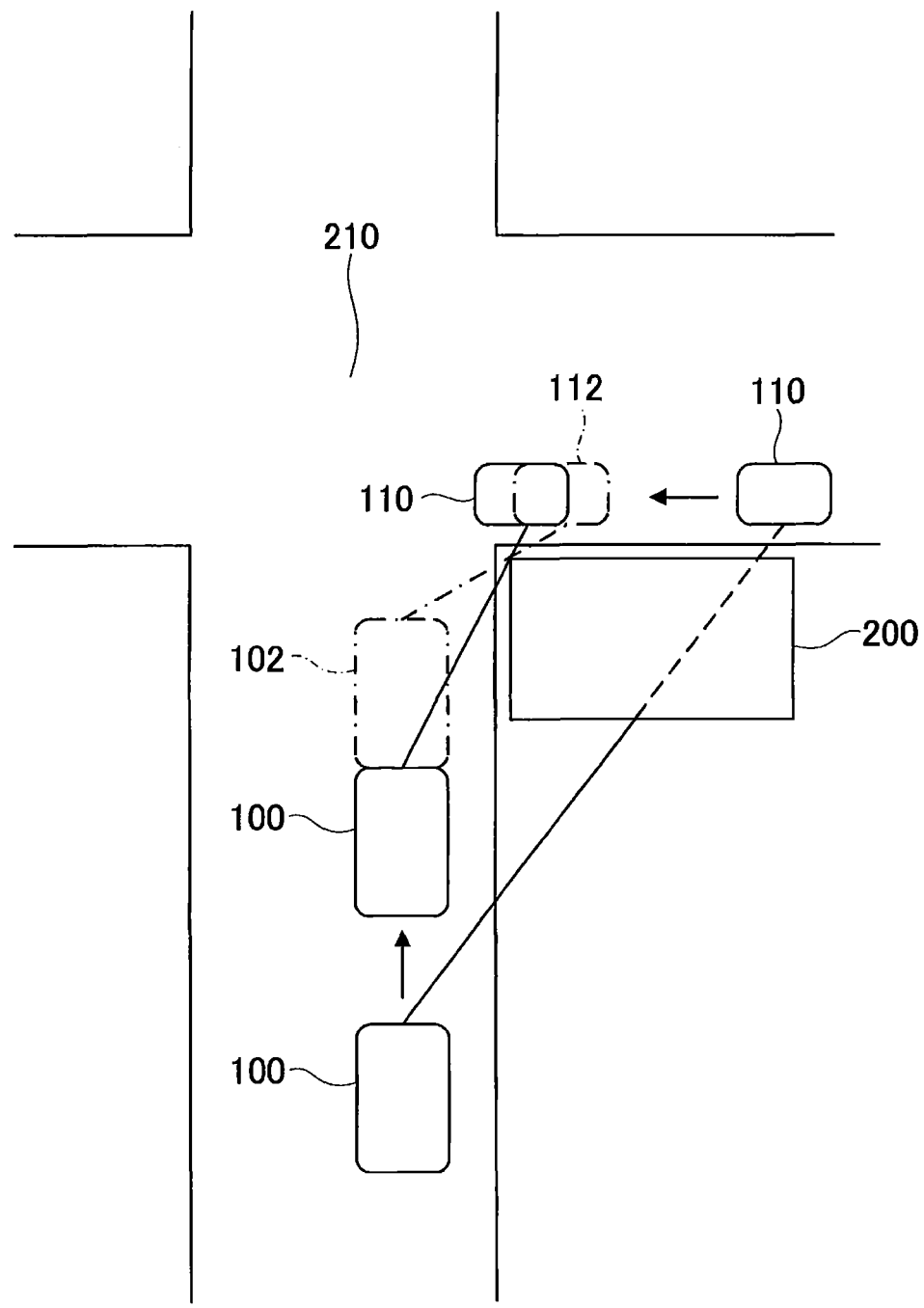
FIG. 2 is a schematic view illustrating positional relationships between an own vehicle, a moving object, and an obstruction.

As illustrated in FIG. 2, a driving assistance procedure is described by way of an example of a situation in which an own vehicle 100 is driving toward an intersection 210 where visibility is restricted by an obstruction 200 such as a building, and at the same time, a moving object 110 is moving toward the same intersection 210 from behind the obstruction 200.

The own vehicle 100 is a vehicle that includes wheels, uses at least one of an internal combustion engine and a motor as the drive source, and allows the driving assistance device 30 to control at least one of the vehicle speed and the traveling direction.

The moving object 110 may include moving objects of any type. As examples of the moving object 110, there may be mentioned a person, a bicycle, and the vehicle including the wheels and the drive source.

Until the moving object 110 behind the obstruction 200 can be seen from the own vehicle 100, the cameras 12 and the millimeter-wave radars 14 cannot detect the moving object 110. When the own vehicle 100 reaches a position 102, the cameras 12 and the millimeter-wave radars 14 can detect the moving object 110 that has moved to a position 112.

Even when the cameras 12 and the millimeter-wave radars 14 detect the moving object 110 at the position 102, and the driving assistance device 30 commands the brake system 62 to actuate brakes so as to avoid collision with the moving object 110, a predicted time to collision is short. Thus, it is difficult to avoid the collision.

As a countermeasure, the driving assistance device 30 indirectly acquires a second movement-information item of the moving object 110 from an external device other than the own vehicle 100 via wireless communication, the information item containing at least a position and a moving speed of the moving object 110 behind the obstruction 200. In addition to the second movement-information item, the driving assistance device 30 directly acquires another movement-information item of the moving object 110 from the cameras 12 and the millimeter-wave radars 14, which contains at least the position and the moving speed of the moving object 110. The other movement-information item is referred to as a first movement-information item.

The driving assistance device 30 is capable of detecting the traveling direction of the own vehicle 100 and a traveling direction of the moving object 110 from changes in their positions.

The driving assistance device 30 acquires the vehicle speed of the own vehicle 100 from the vehicle speed sensor 16, and acquires the position of the own vehicle 100 with the GPS 18 and based on the map data item stored in the map DB device 20. An information item containing at least the position and the vehicle speed of the own vehicle 100 is referred to as a travel information item of the own vehicle 100.

As long as the external device is a wireless device capable of transmitting the second movement-information of the moving object 110 in a wireless manner, the external device may be set to objects of any type. The position and the moving speed of the moving object 110 may be detected by the moving object 110 itself, and then be transmitted by a wireless device of the moving object 110. Alternatively, the position and the moving speed of the moving object 110 may be detected by the roadside equipment, and then be transmitted by a wireless device of the roadside equipment. Still alternatively, the position and the moving speed of the moving object 110 may be received by the control center, and then be transmitted by a wireless device of the control center.

In the following description, a risk (probability) of collision of the own vehicle 100 with the moving object 110, which the driving assistance device 30 determines based on the travel information item of the own vehicle 100 and on the first movement-information item of the moving object 110, is referred to as a first risk (first probability). Meanwhile, another risk (another probability) of collision of the own vehicle 100 with the moving object 110, which the driving assistance device 30 determines based on the travel information item of the own vehicle 100 and on the second movement-information item of the moving object 110, is referred to as a second risk (second probability).

Specifically, based on the first movement-information item of the moving object 110, which the driving assistance device 30 acquires from the cameras 12 and the millimeter-wave radars 14, and on the travel information item of the own vehicle 100, the driving assistance device 30 calculates a TTC (time to collision), which is a predicted time until the own vehicle 100 collides with the moving object 110. As the TTC is shorter, the driving assistance device 30 determines that the first risk of collision of the own vehicle 100 with the moving object 110 is higher.

The driving assistance device 30 calculates the TTC based not on the first movement-information item, but on the second movement-information item of the moving object 110, which the driving assistance device 30 acquires from the external device, and on the travel information item of the own vehicle 100. As the TTC is shorter, the driving assistance device 30 determines that the second risk of collision of the own vehicle 100 with the moving object 110 is higher.

The driving assistance device 30 sets, based on the first risk, an avoidance amount that is used when the driving assistance device 30 controls driving of the own vehicle 100 so as to cause the own vehicle 100 to perform an avoidance driving action, thereby avoiding the collision of the own vehicle 100 with the moving object 110. This avoidance amount is referred to as a first avoidance amount. The avoidance driving action of the own vehicle 100 performed based on the first avoidance amount is referred to as a first avoidance driving action.

Meanwhile, the driving assistance device 30 sets, based on the second risk, another avoidance amount that is used when the driving assistance device 30 controls driving of the own vehicle 100 so as to cause the own vehicle 100 to perform another avoidance driving action (another avoidance maneuver), thereby avoiding the collision of the own vehicle 100 with the moving object 110. This avoidance amount is referred to as a second avoidance amount. The avoidance driving action of the own vehicle 100 performed based on the second avoidance amount is referred to as a second avoidance driving action.

When the first risk is equal to or more than a first threshold at which it can be determined that the collision of the own vehicle 100 with the moving object 110 occurs, the driving assistance device 30 performs the first avoidance driving action.

For example, as the first avoidance driving action in which the braking forces are used, the driving assistance device 30 commands the powertrain system 60 to activate an acceleration-off mode even when a driver has pressed an accelerator pedal. In other words, in the case where the drive source is the internal combustion engine, both a throttle opening degree and injection rates of injectors are reduced to zero. In the case where the drive source is the motor, the driving assistance device 30 interrupts the electric power supply to the motor.

For example, in a case where a sufficient deceleration rate cannot be obtained only by reducing the injection rates of the injectors to zero, the driving assistance device 30 may set a high engine-braking force, for example, by lowering a gear ratio in the powertrain system 60. Similarly, in the case where the drive source is the motor, the driving assistance device 30 may interrupt the electric power supply to the motor, and in addition, drive the motor as a power generator such that what is called regenerative torque generated at the time of driving the motor as a power generator is utilized.

When the driving assistance device 30 reduces both the throttle opening degree and the injection rates of the injectors to zero, engine braking is performed. With this, the braking force is applied. When the driving assistance device 30 interrupts the electric power supply to the motor, the regenerative braking is performed. Also with this, the braking force is applied.

In addition, as the first avoidance driving action in which the braking forces are used, the driving assistance device 30 commands the brake system 62 to actuate the hydraulic brakes.

As the first avoidance driving action via steering, the driving assistance device 30 commands the steering system 64 to perform steering in a direction in which the moving object 110 is avoided.

When the second risk is equal to or more than a second threshold at which it can be determined that the collision of the own vehicle 100 with the moving object 110 occurs, the driving assistance device 30 performs the second avoidance driving action. Note that, the second threshold and the first threshold may be equal to each other, or may be different from each other. Further, as described above, the second threshold is low in information reliability. Accordingly, at a time of setting the second threshold, depending on the reliability, for example, precision in positioning with the GPS may be added to or subtracted from the own vehicle 100 or the moving object 110.

As the second avoidance driving action in which the braking forces are used, as in the first avoidance driving action, the driving assistance device 30 activates the acceleration-off mode even when the driver has depressed the accelerator pedal, so as to apply the braking force to the own vehicle 100. The driving assistance device 30 does not use the hydraulic braking as the second avoidance driving action in which the braking forces are used. Thus, in the second avoidance driving action, the braking force set as the second avoidance amount is smaller than the braking force set as the first avoidance amount in the first avoidance driving action.

The driving assistance device 30 sets not only magnitudes of the braking forces, that is, control amounts of driving controls to cause the own vehicle 100 to perform the avoidance driving actions, but also timings of generating the braking forces, that is, start timings of the driving controls to cause the own vehicle 100 to perform the avoidance driving actions as the avoidance amounts. In this case, one of the timings of generating the braking forces, which is set as the second avoidance amount in the second avoidance driving action, is later than another one of the timings of generating the braking forces, which is set as the first avoidance amount in the first avoidance driving action.

The driving assistance device 30 may perform at least one of setting of the control amount as the second avoidance amount smaller than the control amount that is set as the first avoidance amount, and setting of the driving-control start timing as the second avoidance amount later than the driving-control start timing that is set as the first avoidance amount.

Note that, even when the driving assistance device 30 does not actually generate the braking force as the second avoidance driving action, in the case where brake devices are, for example, hydraulic brakes, the driving assistance device 30 may command the brake system 62 to apply an oil pressure to the hydraulic brakes to an extent that the braking force is not actually applied to the own vehicle 100. With this, when the driving assistance device 30 actually actuates the hydraulic brakes to perform the first avoidance driving action of avoiding the collision with the moving object 110, the braking force is promptly applied to the own vehicle 100.

When the second risk is equal to or more than a third threshold, the driving assistance device 30 may shift a lateral position of the own vehicle 100 in an offset manner in a direction orthogonal to the current traveling direction of the own vehicle 100 as the second avoidance driving action via steering. The third threshold is higher than the second threshold.

The driving assistance device 30 offsets the lateral position before the application of the braking force. The driving assistance device 30 need not necessarily complete the offsetting of the lateral position at once, and may perform the offsetting in a stepwise manner. For example, the driving assistance device 30 may perform first offsetting before the engine braking, and perform second offsetting after the engine braking.

Figure 3:
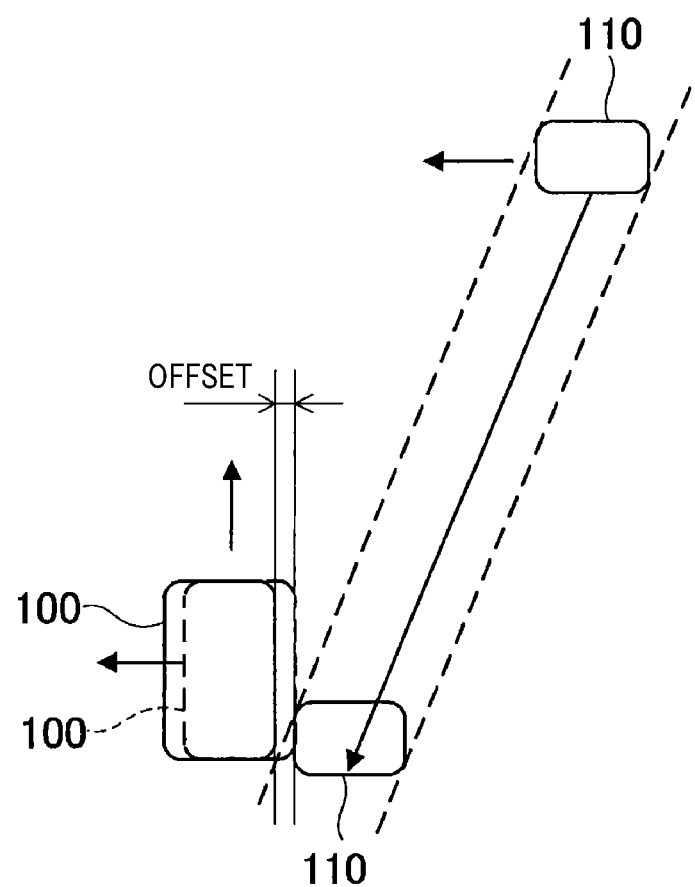
FIG. 3 is an explanatory schematic view illustrating collision avoidance by offsetting.

When the driving assistance device 30 predicts, based on the second movement-information item, that the moving object 110 will collide against a right-hand-side part of the own vehicle 100 with respect to the traveling direction of the own vehicle 100 as illustrated in FIG. 3, the driving assistance device 30 offsets the lateral position of the own vehicle 100 in a direction away from the collision point. In the case illustrated in FIG. 3, the own vehicle 100 is offset in the same direction as a moving direction of the moving object 110.

Figure 4:
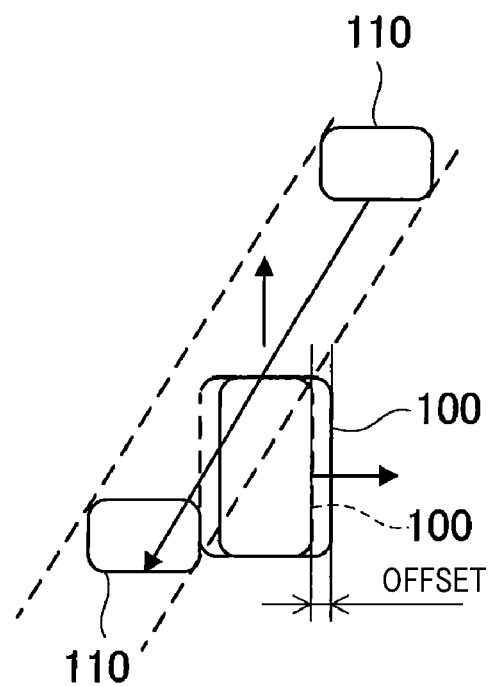
FIG. 4 is an explanatory schematic view illustrating another collision avoidance by offsetting.

When the driving assistance device 30 predicts, based on the second movement-information item, that the moving object 110 will collide against a left-hand-side part of the own vehicle 100 with respect to the traveling direction of the own vehicle 100 as illustrated in FIG. 4, the driving assistance device 30 offsets the lateral position of the own vehicle 100 in another direction away from the collision point. In the case illustrated in FIG. 4, the own vehicle 100 is offset in a direction opposite to the moving direction of the moving object 110.

Note that, the offset directions are not limited to those described with reference to FIG. 3 and FIG. 4. When an offset amount is smaller or when a space on an offset side after the offsetting is larger in a case where the offsetting is being performed in directions opposite to the above-described directions, the offsetting may be performed in these opposite directions.

Note that, a steering amount for performing the offsetting, which is set as the second avoidance amount in the second avoidance driving action, is smaller than a steering amount that is set as the first avoidance amount in the first avoidance driving action.

The driving assistance device 30 sets, as the avoidance amounts, not only the steering amounts, that is, the control amounts of the driving controls to cause the own vehicle 100 to perform the avoidance driving actions, but also timings of starting the steering, that is, the start timings of the driving controls to cause the own vehicle 100 to perform the avoidance driving actions. In this case, one of the timings of starting the steering, which is set as the second avoidance amount in the second avoidance driving action, is later than another one of the timings of starting the steering, which is set as the first avoidance amount in the first avoidance driving action.

(2) Driving Assistance Procedure

Figure 5:
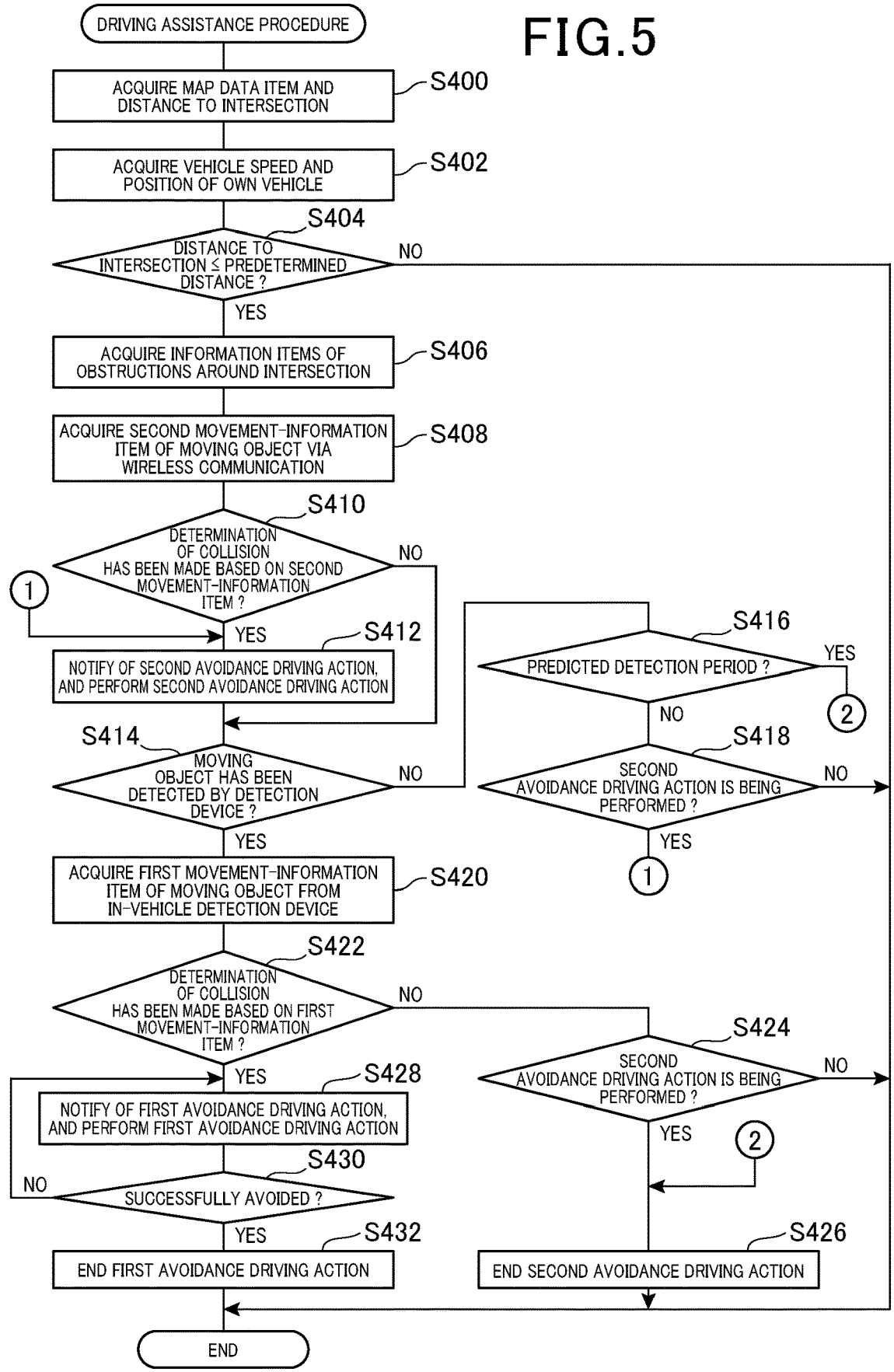
FIG. 5 is a flowchart showing a driving assistance procedure.

With reference to the flowchart shown in FIG. 5, a driving assistance procedure that the driving assistance device 30 executes for avoiding the collision of the own vehicle 100 with the moving object 110 is described. The driving assistance procedure in FIG. 5 is always executed. Note that, in FIG. 5, the letters "S" each represent Step.

In S400, the map acquisition unit 46 acquires a current position of the own vehicle 100 from the GPS 18, and maps the position of the own vehicle 100 in the map data item that is acquired from the map DB device 20. Further, in S400, when there is an intersection ahead of the own vehicle 100 in its traveling direction, the map acquisition unit 46 acquires a distance from the own vehicle 100 to the intersection from the map data item.

In S402, the travel information acquisition unit 32 acquires the vehicle speed from the vehicle speed sensor 16, and the map acquisition unit 46 acquires the position of the own vehicle 100, which is mapped in the map data item.

In S404, the map acquisition unit 46 determines, as a condition for performing the second avoidance driving action, whether or not the distance from the own vehicle 100 to the intersection is equal to or shorter than a predetermined distance.

When the determination in S404 is "No," that is, when the distance from the own vehicle 100 to the intersection is longer than the predetermined distance, even when there is a risk of collision of the own vehicle 100 with the moving object 110, the map acquisition unit 46 determines that it is still unnecessary to perform the second avoidance driving action. In this case, the procedure is ended. Note that, also when there is no intersection ahead of the own vehicle 100, the determination in S404 is "No."

When the determination in S404 is "Yes," that is, when the distance from the own vehicle 100 to the intersection is equal to or shorter than the predetermined distance, and the own vehicle 100 may perform the second avoidance driving action, in S406, the obstruction determination unit 50 acquires, from the map data item, information items of obstructions around the intersection ahead of the own vehicle 100 in its traveling direction.

In S408, the second information acquisition unit 36 acquires the second movement-information item of the moving object 110 moving behind the obstruction 200 as viewed from the own vehicle 100 as illustrated in FIG. 2, the second movement-information item being received by the wireless device 10. The second information acquisition unit 36 may acquire the second movement-information item from any of the moving object 110, the roadside equipment, and the control center.

Figure 6:
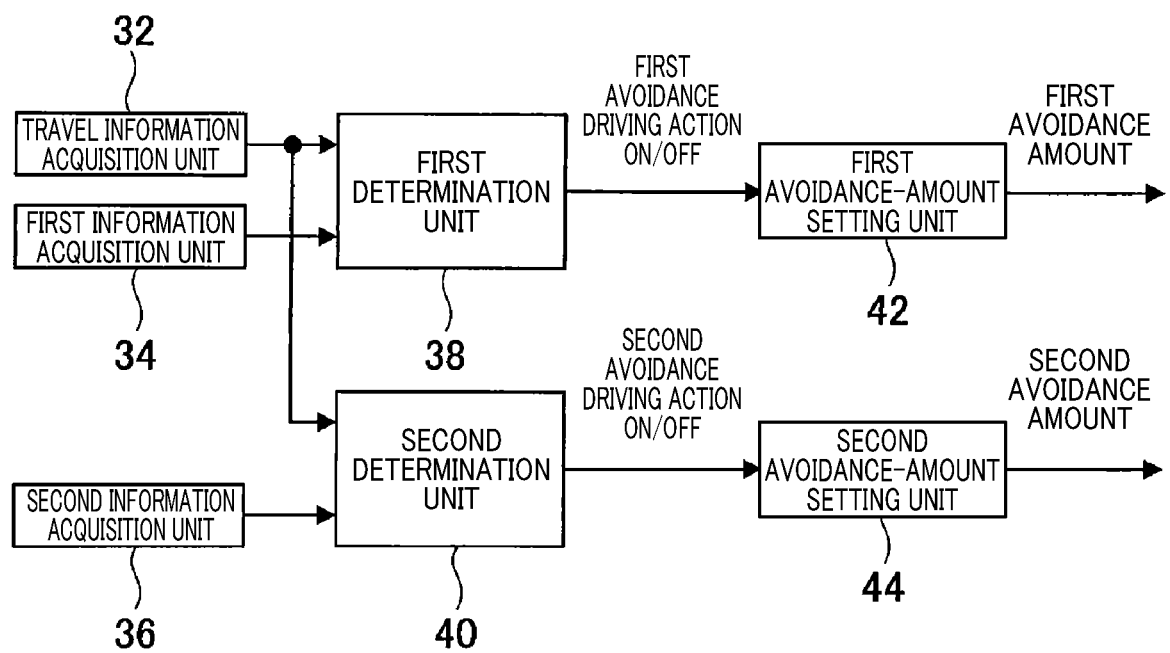
FIG. 6 is an explanatory block diagram showing how avoidance amounts are set.

In S410, as shown in FIG. 6, based on the travel information item of the own vehicle 100, which is acquired from the travel information acquisition unit 32, and on the second movement-information item of the moving object 110, which is acquired from the second information acquisition unit 36, the second determination unit 40 determines whether or not the second avoidance driving action needs to be performed.

Specifically, when the second determination unit 40 determines that the collision of the own vehicle 100 with the moving object 110 is likely to occur, the second determination unit 40 calculates the TTC, which is a time to collision. The second determination unit 40 determines that, as the TTC is shorter, the second risk being the risk of collision of the own vehicle 100 with the moving object 110 is higher.

When the determination in S410 is "No," that is, when the second avoidance driving action need not be performed because the second risk is less than the second threshold, the procedure proceeds to S414. In this case, the second avoidance driving action is not performed, and remained turned off.

When the determination in S410 is "Yes," that is, when the avoidance driving action needs to be performed because the second risk is equal to or more than the second threshold, the second avoidance driving action is turned on. Then, in S412, the notification unit 56 notifies passengers in the own vehicle 100 via the HMI 66 that the second avoidance driving action is performed. The HMI 66 may be, for example, any of a display for image notification, a speaker for voice announcement, and a lamp or the like for flashing notification, or combinations of a plurality of these notifiers.

In addition, in S412, the driving control unit 54 commands at least one of the powertrain system 60, the brake system 62, and the steering system 64 based on the second avoidance amount set by the second avoidance-amount setting unit 44 to perform the above-described second avoidance driving action.

Note that, the second avoidance amount corresponding to the braking force and the offset amounts at the time of performing the second avoidance driving action is not a fixed value, and may be set variable by the second avoidance-amount setting unit 44. For example, the second avoidance-amount setting unit 44 sets the second avoidance amount in accordance with a reliability of wireless communication with the external device, a reliability of the second movement-information item acquired from the external device, and a relative speed of the moving object 110 with respect to the own vehicle 100.

As the reliability of wireless communication and the reliability of the second movement-information item are higher, a reliability of the second risk is higher. Thus, as the second avoidance amount and within allowable ranges, a larger control amount of the driving control can be set, and the driving control can be started at an earlier timing. The reliability of wireless communication and the reliability of the second movement-information item are determined by the reliability determination unit 48.

The reliability determination unit 48 determines the reliability of wireless communication based, for example, on a type of the wireless device, and a condition of wireless communication. For example, the reliability determination unit 48 determines, as the type of the wireless device, that a dedicated wireless device is higher in reliability of wireless communication than mobile phones.

The reliability of the second movement-information item is, for example, a reliability of a position of the moving object 110. The reliability determination unit 48 determines that, as wireless communication with the external device is more frequently used, and as the number of GPS satellites that the moving object 110 detects is larger, the reliability of the position of the moving object 110 is higher.

Further, as the relative speed of the moving object 110 with respect to the own vehicle 100 is higher, the risk of collision of the own vehicle 100 with the moving object 110 is higher. Thus, as the second avoidance amount, the larger control amount of the driving control, and the earlier start timing of the driving control can be set by the second avoidance-amount setting unit 44.

Note that, the braking force and the steering amount being the control amounts of the driving control, which the second avoidance-amount setting unit 44 sets as the second avoidance amount when the second avoidance driving action is turned on in S412, are smaller than the braking force and the steering amount that the first avoidance-amount setting unit 42 sets as the first avoidance amount when the first avoidance driving action is used.

In addition, the start timing of the driving control, which the second avoidance-amount setting unit 44 sets as the second avoidance amount when the second avoidance driving action is turned on in S412, is later than the start timing of the driving control, which the first avoidance-amount setting unit 42 sets as the first avoidance amount when the first avoidance driving action is used.

In S414, the first determination unit 38 determines whether or not at least one of the camera 12 and the millimeter-wave radar 14 has detected the moving object 110.

Irrespective of whether or not the obstruction exists between the position of the own vehicle 100 according to the travel information item and the position of the moving object 110 according to the second movement-information item, when the moving object 110 is not detected by either of the camera 12 and the millimeter-wave radar 14, the determination in S414 is "No."

Meanwhile, when there is no obstruction between the position of the own vehicle 100 and the position of the moving object 110, and the moving object 110 can be detected by at least one of the camera 12 and the millimeter-wave radar 14, the determination in S414 is "Yes."

Whether or not an obstruction exists between the position of the own vehicle 100 and the position of the moving object 110 is determined by the obstruction determination unit 50 based on a position and a size of the obstruction, the position of the own vehicle 100, and the position of the moving object 110, which are indicated in the map data item that the map acquisition unit 46 acquires.

The obstruction determination unit 50 may determine whether or not the obstruction exists between the position of the own vehicle 100 and the position of the moving object 110 based on a position and a size of a stationary object that at least one of the camera 12 and the millimeter-wave radar 14 detects.

When the determination in S414 is "Yes," that is, when at least one of the camera 12 and the millimeter-wave radar 14 has detected the moving object 110, the procedure proceeds to S420.

When the determination in S414 is "No," that is, when neither of the camera 12 and the millimeter-wave radar 14 has detected the moving object 110, in S416, the first determination unit 38 determines that a timing at which the moving object 110 is determined not to have been detected in S414 is within a predicted detection period.

Figure 7:
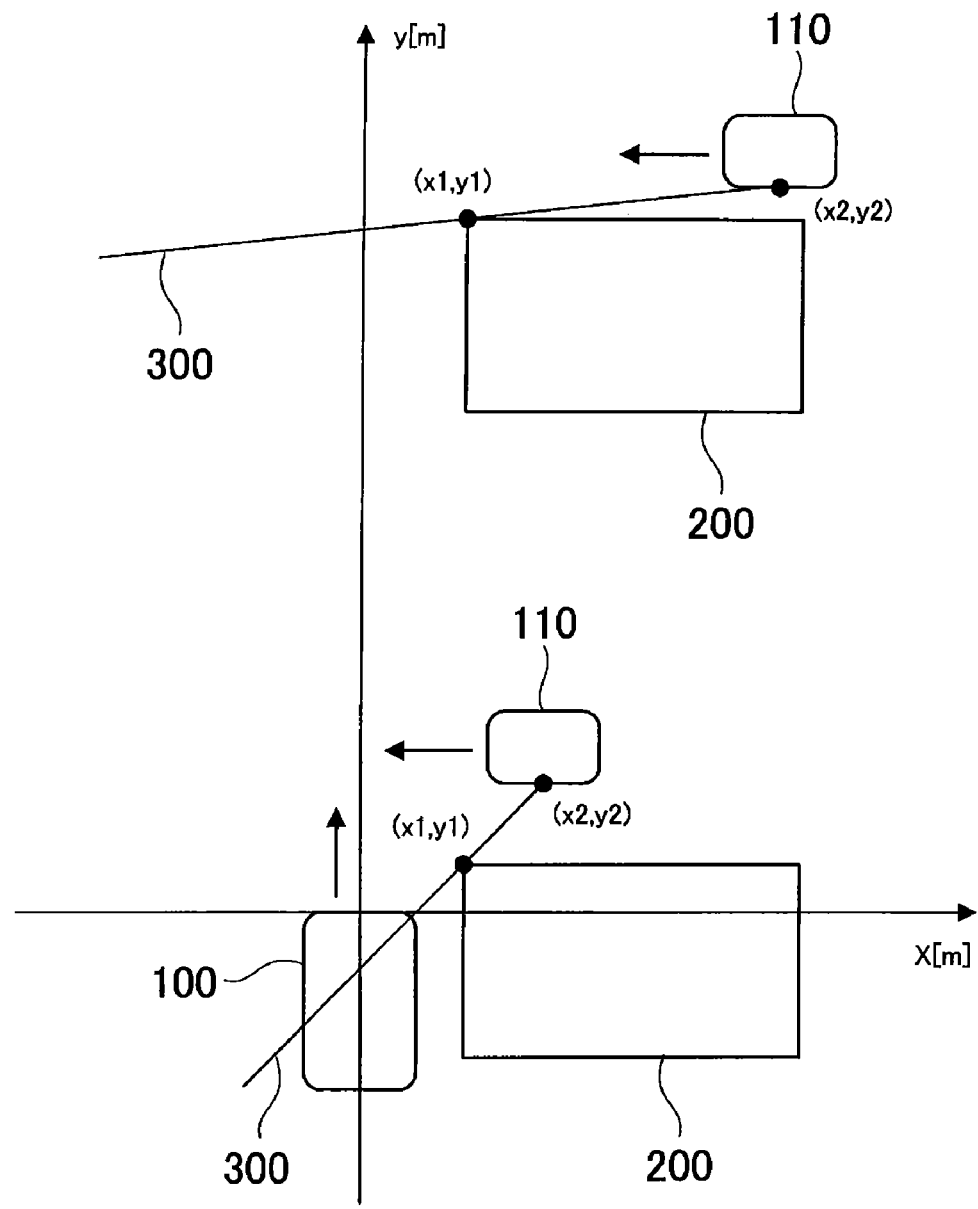
FIG. 7 is an explanatory schematic view showing determinations as to whether or not detection by an in-vehicle detection device can be performed.

Specifically, as shown in FIG. 7, the predicted detection period refers to a period including a timing and its errors when the moving object 110 that emerges from behind the obstruction 200 can be detected by at least one of the camera 12 and the millimeter-wave radar 14. In FIG. 7, when a straight line 300 connecting the moving object 110 and a corner of the obstruction 200 to each other intersects with a position on the own vehicle 100, at which the camera 12 and the millimeter-wave radar 14 are installed, it is determined that the moving object 110 can be detected.

Note that, in FIG. 7, the positions of the own vehicle 100, the moving object 110, and the obstruction 200 are represented as coordinates with respect to a front central portion of the own vehicle 100, which is fixed in position as an origin. Further, the straight line 300 connecting the corner of the obstruction 200 and the moving object 110 to each other extends through a lateral central portion on the own vehicle 100 side of the moving object 110. The straight line 300 is expressed by the following equation (1).

$$y = ax + b \qquad (1)$$

When coordinates of the corner of the obstruction 200 are (x1, y1), and when coordinates of the moving object 110 that intersects with the straight line 300 are (x2, y2), a slope "a" of the straight line 300 is expressed by the following equation (2).

$$a=(y2-y1)/(x2-x1) \quad (2)$$

The coordinates (x1, y1) of the corner of the obstruction 200 can be detected by the camera 12 and the millimeter-wave radar 14. The coordinates (x2, y2) of the moving object 110 are contained in the second movement-information item that the second information acquisition unit 36 acquires via wireless communication.

When the coordinates (x1, y1) are substituted into the equation (1), an intercept "b" is expressed by the following equation (3).

$$b=-a \times x1+y1 \quad (3)$$

Then, when y=0 is substituted into the equation (1), an X-coordinate at which the straight line 300 intersects with the X-axis is expressed by the following equation (4).

$$x=-b/a \quad (4)$$

Note that, normally, the camera 12 and the millimeter-wave radar 14 are installed at different positions, and hence a coordinate system of the camera 12 and a coordinate system of the millimeter-wave radar 14 are different from each other. However, the camera 12 and the millimeter-wave radar 14 are similar to each other except their coordinate systems. Thus, in FIG. 7, for the sake of simplicity of description, the camera 12 and the millimeter-wave radar 14 are installed at the same position in the front central portion of the own vehicle 100. In other words, the coordinate system of the camera 12 and the coordinate system of the millimeter-wave radar 14 are set the same as each other.

The moving object 110 behind the obstruction 200 cannot be detected by at least one of the camera 12 and the millimeter-wave radar 14 until the X-coordinate at which the straight line 300 intersects with the X-axis that aligns with the front of the own vehicle 100 satisfies the following inequality (5).

$$|-b/a|<k \quad (5)$$

In the inequality (5), a constant "k" is set as appropriate in consideration of, for example, errors in detection by the millimeter-wave radar 14.

In the inequality (5), "a" and "b" are represented by the coordinates x1, x2, y1, and y2. The coordinates x1, x2, y1, and y2 are represented as variables in accordance with a lapse of time since the moving object 110 having the risk of collision is detected based on the vehicle speed and the position of the own vehicle 100, and on the position and the moving speed of the moving object 110. The prediction unit 52 calculates the predicted detection period to be used in the determination in S416 from the inequality (5).

In this embodiment, a method using a linear function approximation as described above is exemplified as a simple method using programs to be implemented. However, in consideration of deceleration rates of the moving object 110 and the own vehicle 100, a quadratic function approximation or approximations by functions with higher orders may be employed.

When the determination in S416 is "Yes," that is, when neither of the camera 12 and the millimeter-wave radar 14 has detected the moving object 110 despite in the predicted detection period, it can be determined that the moving speed of the moving object 110 is lower than that according to the second movement-information item. Thus, the detection of the moving object 110 has been still hindered by the obstruction 200.

In this case, neither of the camera 12 and the millimeter-wave radar 14 has detected the moving object 110, and hence the first determination unit 38 determines that the collision of the own vehicle 100 with the moving object 110 will not occur. As a result, the procedure returns to S426. In S426, the driving control unit 54 ends the second avoidance driving action.

When the determination in S416 is "No," that is, when the timing at which the moving object 110 is determined not to have been detected in S414 is out of the predicted detection period, in S418, the driving control unit 54 controls driving of the own vehicle 100, and determines whether or not the second avoidance driving action is being performed. When the determination in S418 is "Yes," that is, when the driving control unit 54 is performing the second avoidance driving action, the procedure returns to S412 such that the second avoidance driving action is continued.

When the determination in S418 is "No," that is, when the driving control unit 54 is not performing the second avoidance driving action, the procedure is ended.

S420 is executed when the moving object 110 can be detected by at least one of the camera 12 and the millimeter-wave radar 14. Thus, in S420, the first information acquisition unit 34 acquires the first movement-information item of the moving object 110 from at least one of the camera 12 and the millimeter-wave radar 14.

In S422, as shown in FIG. 6, based on the travel information item of the own vehicle 100, which is acquired from the travel information acquisition unit 32, and on the first movement-information item of the moving object 110, which is acquired from the first information acquisition unit 34, the first determination unit 38 determines whether or not the first avoidance driving action needs to be performed.

A determination method therein is substantially the same as the above-described determination method in S410 except that the second movement-information item is used instead of the first movement-information item and that the second determination unit 40 is used instead of the first determination unit 38. Thus, specific description of this determination method is omitted. When the determination in S422 is "Yes," that is, when the first avoidance driving action needs to be performed, the procedure proceeds to S428.

When the determination in S422 is "No," that is, when the first avoidance driving action need not be performed and the first avoidance driving action is turned off, in S424, it is determined that the second avoidance driving action is being performed. A reliability of the first movement-information item acquired directly from the camera 12 and the millimeter-wave radar 14 is higher than the reliability of the second movement-information item acquired indirectly from the external device via wireless communication.

Thus, when the determination in S422 is "No," that is, when the first avoidance driving action need not be performed, and at the same time, when the determination in S424 is "Yes," that is, when the second avoidance driving action is being performed, in S426, the driving control unit 54 ends the second avoidance driving action.

The process of S428, which is executed when the determination in S422 is "Yes," that is, when the first avoidance driving action needs to be performed and the first avoidance driving action is turned on, continues to be executed until the determination of "Yes" is made by the first determination unit 38 in S430 and the collision of the own vehicle 100 with the moving object 110 is avoided by the first avoidance driving action.

In S428, as at the time of notifying of the second avoidance driving action, the notification unit 56 notifies the passengers in the own vehicle 100 via the HMI 66 that the first avoidance driving action is being performed. Also in S428, the driving control unit 54 commands at least one of the powertrain system 60, the brake system 62, and the steering system 64 based on the first avoidance amount calculated by the first avoidance-amount setting unit 42 to perform the above-described first avoidance driving action.

When the determination of "Yes" is obtained in S430, that is, when the collision of the own vehicle 100 with the moving object 110 is avoided by the first avoidance driving action, in S432, the driving control unit 54 ends the first avoidance driving action.

3. Advantageous Effects

According to the above-described embodiment, the following advantageous effects can be obtained.

(1) Even when the moving object 110 cannot be detected by either of the camera 12 and the millimeter-wave radar 14, the driving assistance device 30 performs the second avoidance driving action based on the second movement-information item acquired indirectly from the external device via wireless communication.

The second avoidance driving action is performed in advance before at least one of the camera 12 and the millimeter-wave radar 14 detects the moving object 110 and the first avoidance driving action is started. Thus, it is more likely that the collision of the own vehicle 100 with the moving object 110 can be avoided by the first avoidance driving action. Further, even if the collision of the own vehicle 100 with the moving object 110 occurs, damage to the own vehicle 100 and the moving object 110 can be reduced.

(2) The reliability of the second risk is lower than a reliability of the first risk. Thus, in the case of setting the control amounts of the driving controls, the driving assistance device 30 sets the control amount as the second avoidance amount smaller than the control amount as the first avoidance amount, and in the case of setting the start timings of the driving controls, the driving assistance device 30 sets the start timing as the second avoidance amount later than the start timing as the first avoidance amount. With this, even in the case where the second avoidance driving action with respect to the moving object 110 that is out of sight of the passengers in the own vehicle 100 is performed, anxiety of the passengers can be alleviated.

(3) The notification unit 56 notifies the passengers that the second avoidance driving action is performed. With this, the passengers can understand why the second avoidance driving action with respect to the moving object 110 that is out of sight of the passengers in the own vehicle 100 is being performed. Also with this, the anxiety of the passengers can be alleviated.

(4) The braking force generated as the second avoidance driving action by at least one of the engine braking and the regenerative braking is set smaller than the braking force generated as the first avoidance driving action by the hydraulic braking. Thus, sudden braking can be restrained. With this, a collision of a vehicle following the own vehicle 100 with the own vehicle 100 due to the sudden braking can be avoided.

(5) The second avoidance amount is variably set in accordance with the reliability of wireless communication, the reliability of the second movement-information item, and the relative speed of the moving object 110 with respect to the own vehicle 100. With this, the second avoidance amount can be properly set.

In the above-described embodiment, the camera 12 and the millimeter-wave radar 14 correspond to detection devices, and the map DB device 20 corresponds to a storage device.

Further, S400 and S404 correspond to the processes performed by the map acquisition unit 46. S402 corresponds to the process performed by the travel information acquisition unit 32. S406 corresponds to the process performed by the obstruction determination unit 50. S408 corresponds to the process performed by the second information acquisition unit 36. S410 corresponds to the process performed by the second determination unit 40. Part of S412 and part of S428 correspond to the processes performed by the notification unit 56. Part of S412, S418, S424, S426, part of S428, and S432 correspond to the processes performed by the driving control unit 54. Part of S412 corresponds to the process performed by the second avoidance-amount setting unit 44. Part of S412 corresponds to the process performed by the reliability determination unit 48. S414, part of S416, S422, and S430 correspond to the processes performed by the first determination unit 38. Part of S416 corresponds to the process performed by the prediction unit 52. S420 corresponds to the process performed by the first information acquisition unit 34. Part of S428 corresponds to the process performed by the first avoidance-amount setting unit 42.

4. Other Embodiments (1) The driving assistance device 30 may perform, as the second avoidance driving action, at least one of the engine braking and the regenerative braking, or the offsetting of the lateral position of the own vehicle 100 in only one of the directions.

(2) When the oil pressure is not applied to the hydraulic brakes at the time of ending the second avoidance driving action, the driving assistance device 30 may then start to apply the oil pressure to the hydraulic brakes to the extent that the hydraulic brakes are not actually actuated. With this, at the time of performing the first avoidance driving action, the braking force generated by the hydraulic brakes can be promptly applied to the own vehicle 100.

(3) When the first information acquisition unit 34 has not acquired the first movement-information item from either of the camera 12 and the millimeter-wave radar 14 being the detection devices installed in the own vehicle 100, and at the same time, when the second information acquisition unit 36 has acquired the second movement-information item via wireless communication, the obstruction determination unit 50 may determine that the obstruction 200 that hinders the detection of the moving object 110 by the camera 12 and the millimeter-wave radar 14 exists between the own vehicle 100 and the moving object 110.

(4) When it is highly likely that the collision with the moving object 110 can be avoided, the driving assistance device 30 may increase, as the second avoidance driving action, the vehicle speed of the own vehicle 100.

(5) A plurality of functions of one of the plurality of components in the above-described embodiment may be performed by the plurality of components, or a single function of the one of the plurality of components may be performed by the plurality of components. Alternatively, a plurality of functions of the plurality of components may be performed by the one of plurality of components, or a single function of the plurality of components may be performed by the one of the plurality of components. Further, a part of the configuration of the above-described embodiment may be omitted. Still further, at least the part of the configuration of the above-described embodiment may be added to or replaced with another part of the configuration of the above-described embodiment. Note that, the embodiments of the present disclosure correspond to all the examples encompassed within the technical idea specified only by the wording of the claims.

(6) The present disclosure is not limited to the above-described driving assistance device, and may encompass various other embodiments such as a driving assistance program for causing a computer to function as the driving assistance device, a computer-readable storage medium storing this driving assistance program, and a driving assistance method.

The invention claimed is:

1. A driving assistance device comprising:
a travel information acquisition unit configured to acquire at least a position and a vehicle speed of an own vehicle as a travel information item of the own vehicle;
a first information acquisition unit configured to acquire, as a first movement-information item of a moving object around the own vehicle, at least a position and a speed of the moving object from a detection device installed in the own vehicle;
a second information acquisition unit configured to acquire, as a second movement-information item of the moving object, at least a position and a speed of the moving object from an external device that is external to the own vehicle;
a first determination unit configured to
determine, based on the travel information item that the travel information acquisition unit acquires and on the first movement-information item that the first information acquisition unit acquires, a first risk of collision of the own vehicle with the moving object, and
determine, based on the first risk, whether or not to perform a first avoidance driving action for avoiding colliding of the own vehicle with the moving object;
a second determination unit configured to
determine, based on the travel information item that the travel information acquisition unit acquires and on the second movement-information item that the second information acquisition unit acquires, a second risk of collision of the own vehicle with the moving object, and
determine, based on the second risk, whether or not to perform a second avoidance driving action for avoiding colliding of the own vehicle with the moving object;
a first avoidance-amount setting unit configured to set, when the first determination unit determines that the first avoidance driving action is being performed, a first avoidance amount for avoiding colliding of the own vehicle with the moving object based on the first risk that the first determination unit determines;
a second avoidance-amount setting unit configured to
set, when the second determination unit determines that the second avoidance driving action is being performed, a second avoidance amount for avoiding colliding of the own vehicle with the moving object based on the second risk that the second determination unit determines,
set, when the second avoidance-amount setting unit sets a control amount of a control of driving of the own vehicle as the second avoidance amount, the control amount smaller than a control amount that is set as the first avoidance amount by the first avoidance-amount setting unit in a case where the first avoidance driving action is performed, and
set, when the second avoidance-amount setting unit sets a start timing of the control of driving of the own vehicle as the second avoidance amount, the start timing later than a start timing that is set as the first avoidance amount by the first avoidance-amount setting unit in the case where the first avoidance driving action is performed; and
a driving control unit configured to control, based on the first avoidance amount that the first determination unit sets and on the second avoidance amount that the second avoidance-amount setting unit sets, a motion of the own vehicle such that colliding of the own vehicle with the moving object is avoided.

2. The driving assistance device according to claim 1, further comprising an obstruction determination unit configured to determine whether or not an obstruction that hinders detection of the moving object by the detection device exists between the own vehicle and the moving object, wherein
the second information acquisition unit is configured to acquire the second movement-information item from the external device via wireless communication, and
the driving control unit is configured to control driving of the own vehicle based on the second avoidance amount when the obstruction determination unit determines that the obstruction exists, and to control driving of the own vehicle based on the first avoidance amount when the obstruction determination unit determines that no obstruction exists.

3. The driving assistance device according to claim 2, further comprising a map acquisition unit configured to acquire a map data item from a storage device storing the map data item, wherein
the obstruction determination unit is configured to determine, based on the map data item that the map acquisition unit acquires, whether or not the obstruction exists.

4. The driving assistance device according to claim 1, wherein the driving control unit is configured to end the control of driving of the own vehicle based on the second avoidance amount when, under a state in which the driving control unit is controlling driving of the own vehicle based on the second avoidance amount, the first determination unit determines that colliding the own vehicle with the moving object will not occur.

5. The driving assistance device according to claim 4, further comprising a prediction unit configured to predict, based on the travel information item and the second movement-information item, a timing when the moving object having not been detected by the detection device can be detected by the detection device, wherein
the first determination unit is configured to determine that colliding of the own vehicle with the moving object will not occur when, under the state in which the driving control unit is controlling driving of the own vehicle based on the second avoidance amount, the moving object can be detected by the detection device at a timing earlier than the timing that the prediction unit predicts.

6. The driving assistance device according to claim 4, further comprising a prediction unit configured to predict, based on the travel information item and the second movement-information item, a timing when the moving object having not been detected by the detection device can be detected by the detection device, wherein the first determination unit is configured to determine that colliding of the own vehicle with the moving object will not occur when, under the state in which the driving control unit is controlling driving of the own vehicle based on the second avoidance amount, the moving object cannot be detected by the detection device at or after the timing that the prediction unit predicts.

7. The driving assistance device according to claim 1, further comprising a reliability determination unit configured to determine a reliability of the second movement-information item, wherein the second avoidance-amount setting unit is configured to set, when the second avoidance-amount setting unit sets the control amount as the second avoidance amount, the control amount smaller as the reliability of the second movement-information item becomes lower, the reliability being determined by the reliability determination unit, and set, when the second avoidance-amount setting unit sets the start timing as the second avoidance amount, the start timing as the second avoidance amount later as the reliability of the second movement-information item becomes lower, the reliability being determined by the reliability determination unit.

8. The driving assistance device according to claim 1, wherein the second avoidance-amount setting unit is configured to set, when the second avoidance-amount setting unit sets the control amount as the second avoidance amount, the control amount smaller as the speed of the moving object is lower, and set, when the second avoidance-amount setting unit sets the start timing as the second avoidance amount, the start timing as the second avoidance amount later as the speed of the moving object is lower.

9. The driving assistance device according to claim 1, wherein the driving control unit is configured to shift a lateral position of the own vehicle in a direction orthogonal to a traveling direction of the own vehicle when the second determination unit determines that colliding of the own vehicle with the moving object will occurs.

10. The driving assistance device according to claim 9, wherein the second determination unit is configured to predict a collision point of the own vehicle, the moving object colliding against the collision point, and the driving control unit is configured to set a direction of shifting the lateral position in accordance with the collision point that the second determination unit predicts.

11. A computer-implemented method for providing driving assistance comprising:

acquiring at least a position and a vehicle speed of an own vehicle as a travel information item of the own vehicle;

acquiring, as a first movement-information item of a moving object around the own vehicle, at least a position and a speed of the moving object from a detection device installed in the own vehicle;

acquiring, as a second movement-information item of the moving object, at least a position and a speed of the moving object from an external device that is external to the own vehicle;

determining, based on the travel information item and on the first movement-information item, a first risk of collision of the own vehicle with the moving object;

determining, based on the first risk, whether or not to perform a first avoidance driving action for avoiding colliding of the own vehicle with the moving object;

determining, based on the travel information item and on the second movement-information item, a second risk of collision of the own vehicle with the moving object;

determining, based on the second risk, whether or not to perform a second avoidance driving action for avoiding colliding of the own vehicle with the moving object;

setting, based on determining that the first avoidance driving action is being performed, a first avoidance amount for avoiding colliding of the own vehicle with the moving object based on the first risk;

setting, based on determining that the second avoidance driving action is being performed, a second avoidance amount for avoiding colliding of the own vehicle with the moving object based on the second risk;

setting, based on setting a control amount of a control of driving of the own vehicle as the second avoidance amount, the control amount to be smaller than a control amount that is set as the first avoidance amount in a case where the first avoidance driving action is performed;

setting, based on setting a start timing of the control of driving of the own vehicle as the second avoidance amount, the start timing to be later than a start timing that is set as the first avoidance amount in the case where the first avoidance driving action is performed; and controlling, based on the first avoidance amount and on the second avoidance amount, a motion of the own vehicle such that colliding of the own vehicle with the moving object is avoided.

12. A system for providing driving assistance comprising:

a processor;

a non-transitory computer-readable storage medium; and a set of computer-executable instructions stored on the non-transitory computer-readable storage medium that cause the processor to:

acquiring at least a position and a vehicle speed of an own vehicle as a travel information item of the own vehicle;

acquiring, as a first movement-information item of a moving object around the own vehicle, at least a position and a speed of the moving object from a detection device installed in the own vehicle;

acquiring, as a second movement-information item of the moving object, at least a position and a speed of the moving object from an external device that is external to the own vehicle;

determining, based on the travel information item and on the first movement-information item, a first risk of collision of the own vehicle with the moving object;

determining, based on the first risk, whether or not to perform a first avoidance driving action for avoiding colliding of the own vehicle with the moving object;

determining, based on the travel information item and on the second movement-information item, a second risk of collision of the own vehicle with the moving object;

determining, based on the second risk, whether or not to perform a second avoidance driving action for avoiding colliding of the own vehicle with the moving object;

setting, based on determining that the first avoidance driving action is being performed, a first avoidance amount for avoiding colliding of the own vehicle with the moving object based on the first risk;

setting, based on determining that the second avoidance driving action is being performed, a second avoidance amount for avoiding colliding of the own vehicle with the moving object based on the second risk;

setting, based on setting a control amount of a control of driving of the own vehicle as the second avoidance amount, the control amount to be smaller than a control amount that is set as the first avoidance amount in a case where the first avoidance driving action is performed;

setting, based on setting a start timing of the control of driving of the own vehicle as the second avoidance amount, the start timing to be later than a start timing that is set as the first avoidance amount in the case where the first avoidance driving action is performed; and controlling, based on the first avoidance amount and on the second avoidance amount, a motion of the own vehicle such that colliding of the own vehicle with the moving object is avoided.

* * * * *